(12) United States Patent
Hars et al.

(10) Patent No.: US 7,302,458 B2
(45) Date of Patent: Nov. 27, 2007

(54) METHOD AND APPARATUS FOR CHOOSING A COMBINATION OF LOGIC FOR GENERATING RANDOM NUMBERS USING A DIFFERENCE SIGNAL

(75) Inventors: Laszlo Hars, Cranberry Township, PA (US); Michael Epstein, Spring Valley, NY (US)

(73) Assignee: NXP B.V., Eindhoven (NL)

( * ) Notice: Subject to any disclaimer, the term of this patent is extended or adjusted under 35 U.S.C. 154(b) by 717 days.

(21) Appl. No.: 10/801,811

(22) Filed: Mar. 15, 2004

(65) Prior Publication Data

US 2004/0267846 A1    Dec. 30, 2004

Related U.S. Application Data

(60) Provisional application No. 60/454,815, filed on Mar. 14, 2003.

(51) Int. Cl.
 *G06F 1/02* (2006.01)

(52) U.S. Cl. .................................................. 708/250
(58) Field of Classification Search ......... 708/250–256
 See application file for complete search history.

(56) References Cited

U.S. PATENT DOCUMENTS

| 4,799,259 | A | * | 1/1989 | Ogrodski ..................... 708/251 |
| 5,757,923 | A | * | 5/1998 | Koopman, Jr. .............. 708/250 |
| 6,480,072 | B1 | * | 11/2002 | Walsh et al. ................. 708/250 |
| 6,963,888 | B2 | * | 11/2005 | Weimerskirch ............. 708/250 |

* cited by examiner

*Primary Examiner*—Chat C. Do

(57) ABSTRACT

An apparatus and method for random number generation, including a plurality of cross-connected latches 210, 215, 220, 225, providing at least two latch outputs (latch1, latch0) is provided. A first XOR 261 receives the at least two latch outputs (latch0, latch1) as an input, and generates a mistake signal "E" when its inputs do not match from the at least two latch outputs (latch0, latch1) being at different logic states. The mistake signal is compared with a previously stored mistake signal by a second XOR 265 to determine whether to obtain a random bit from a pseudo random stream of bits.

23 Claims, 5 Drawing Sheets

METHOD AND APPARATUS FOR CHOOSING A COMBINATION OF LOGIC FOR GENERATING RANDOM NUMBERS USING A DIFFERENCE SIGNAL

This application claims priority to Provisional Ser. No. 60/454,815 filed Mar. 14, 2003.

FIELD OF THE INVENTION

The invention relates to the phenomenon of metastability, and the use of metastability in the field of random number generation.

BACKGROUND ART

The violation of the operating conditions of the flip-flops can cause them to go into an unstable (metastable) state. Metastability can occur when both inputs to a simple latch are set at a logic high (11) and are subsequently set at a logic low (00). Metastability can cause the latch outputs to oscillate unpredictably in a statistically known manner. Such metastable values are then detected by other circuitry as different logic states. Metastable latches also arrive at a random stable state after a period of time.

It has been found that intentionally inducing metastability provides the ability to harness the unpredictability of metastable flip-flop outputs as a random number generator.

The use of multiple meta-stable elements to generate a random event has been the subject of previous patent applications for random number generators by the current inventors. In such a random number generator, there are two latches that are placed in a metastable state, which resolves to a known but unpredictable condition. The outputs of the latches are compared, and if they differ, then a bit value is chosen from an unbiased stream of bits. This method works especially well if the meta-stable elements are biased (meaning that they produce more ones than zeros, or vice versa).

A drawback of previous metastable random number generator circuits was that the metastable elements were symmetrical. In some cases a tunable delay has been introduced for at least one of the elements because there are sometimes slight differences in even identical circuits due to manufacturing variations, temperature variations, etc.

SUMMARY OF THE INVENTION

The present invention provides a new method and apparatus for generating random numbers by using the metastability of simple latches.

According to a first aspect of the invention, a random number generator uses meta-stable elements that are synchronized by a set of flip-flops. The output of the stabilizing flip-flops are compared and used to generate counter events with a minimum of hardware.

According to another aspect of the present invention, the random number generator provides a more practical implementation as it does not rely on the metastable elements being symmetrical. Nevertheless, if two meta-stable elements are not identical, then it is also possible that they would differ almost always. Thus, the stream of chosen bits would be as predictable as the stream of unbiased bits. We offer a solution to this problem as well.

DETAILED EMBODIMENTS

It is understood by persons of ordinary skill in the art that the types of gates shown herein below were selected for explanatory purposes, and there can be different arrangements of different type of gates in terms of size, function and connectivity that fall within the spirit of the invention and the scope of the appended claims.

Figure 1:
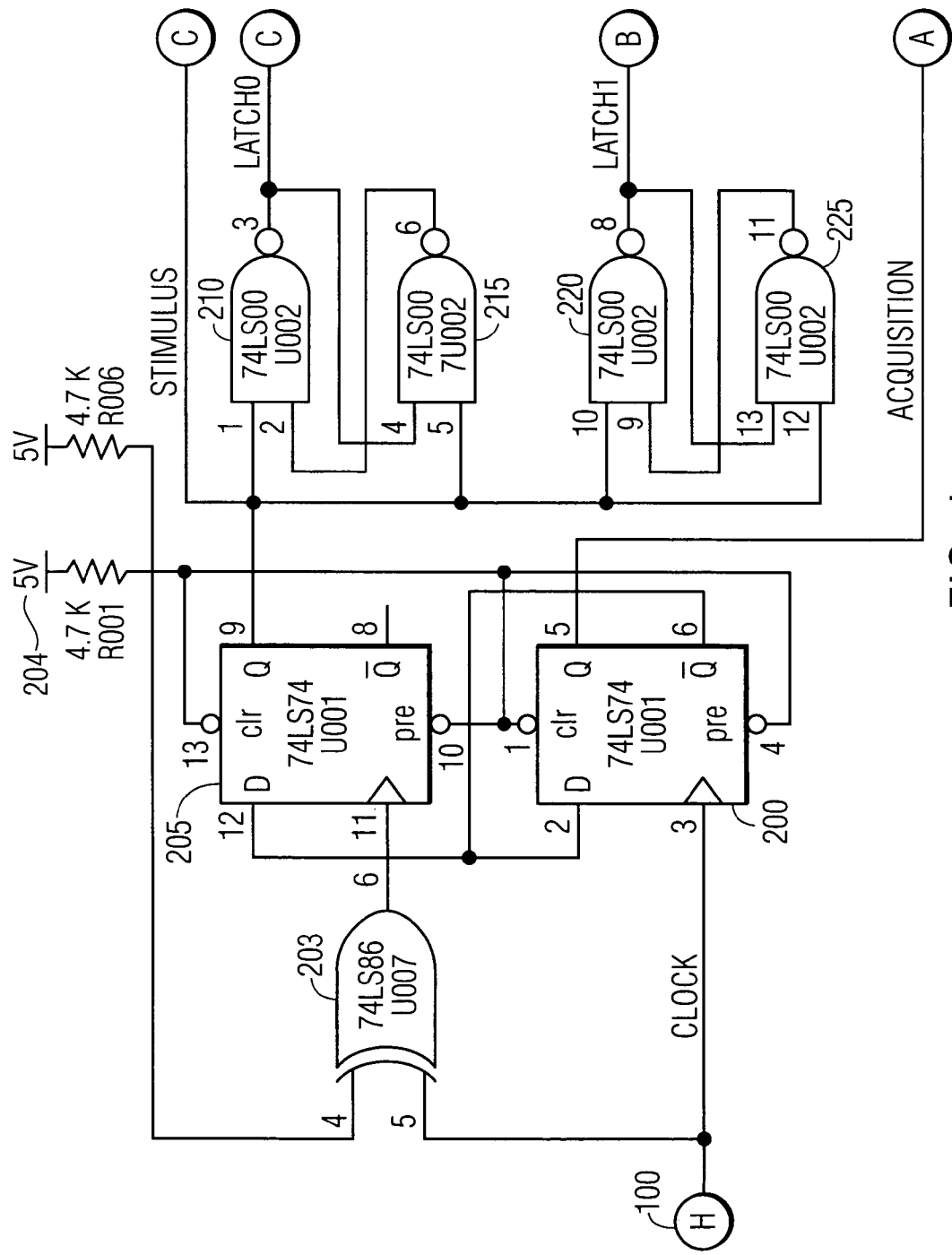
FIG. 1 illustrates an aspect of the random number generator according to the present invention, wherein an arrangement of latches is shown receiving a clock signal generated from the circuit in FIG. 1.

FIG. 1 illustrates a pair of D flip-flips 205, 210 that actually form a 74LS74 semiconductor, which is a dual positive edge triggered pair of flip-flops with preset, clear and complementary outputs. It can be seen in FIG. 2 that the preset 4, 10 and clear inputs 1, 13 receive a voltage from 5V source 204 after a drop across current limiting resistor R001. A low logic level on the preset or clear inputs will set or reset the outputs regardless of the logic levels of the other inputs. Applicants stress again that the practical examples are provided for illustrative purposes, and in no way should the instant invention and the appended claims be interpreted to limit the invention to these specific semiconductors or equivalents thereof. Boolean equivalents can be used for any of the circuitry shown and described.

The clock source 100 is connected to the clock input 3 of flip-flop 200. The clock input 11 of flip-flop 205 receives its clock input via XOR 203, which has a first input 5 from the source 100 and a second input 4 of a voltage remainder of a 5 volt source that is dropped across 4.7K ohm Resistor R006 thus converting XOR 203 to a simple inverter. Therefore, the clock input 11 of flip-flop 205 is high only when pin 6 on flip-flop 200 is low.

In the arrangement of flip flops-200, 205, the QBAR of flip-flop 200 is looped back to the D inputs 2, 12 of both flip-flops 200, 205. The Q output 5 of flip-flop 200 is provided to line A (Acquisition) shown in FIGS. 2A and 2B.

Figure 2A:
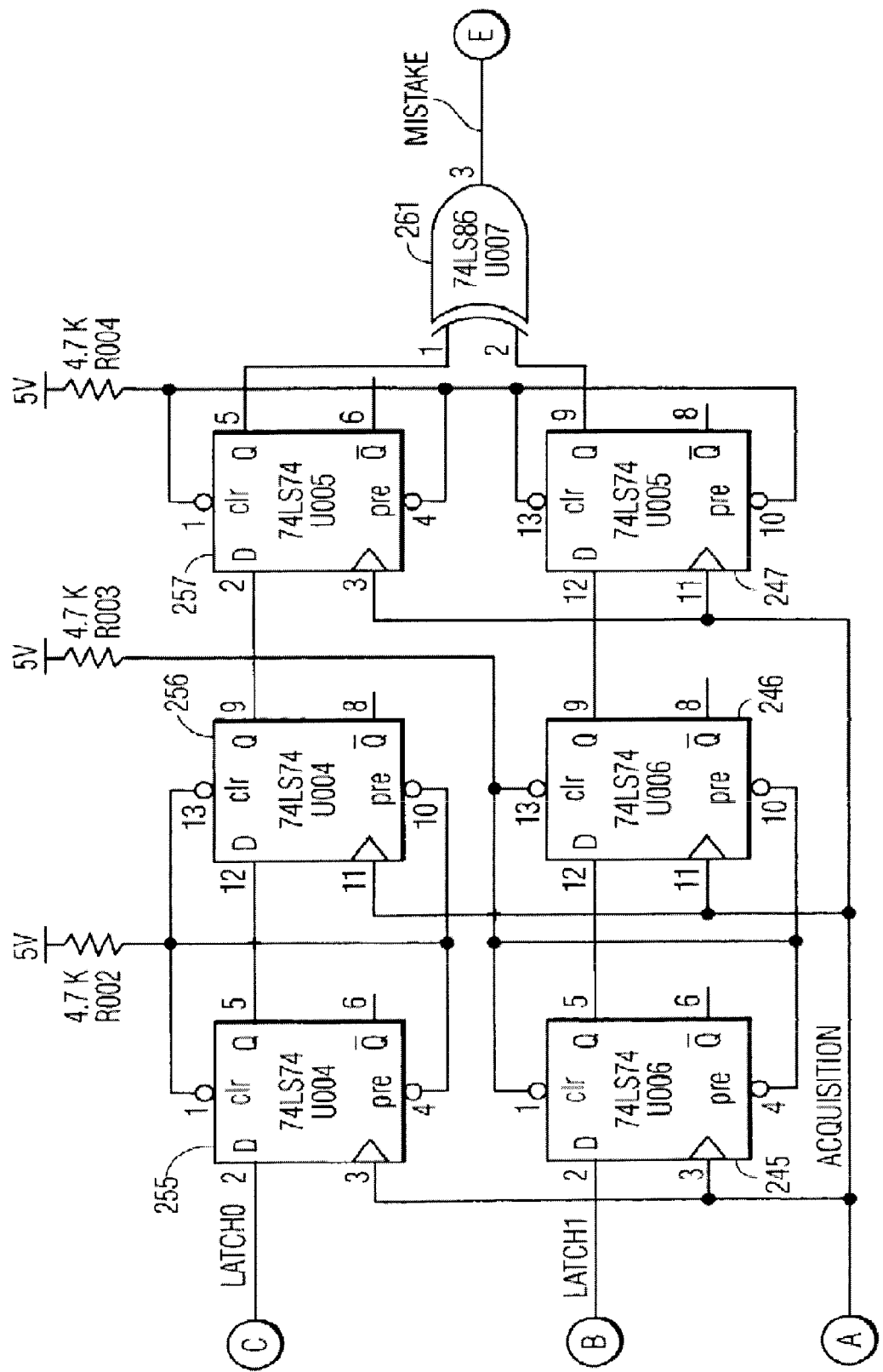
FIGS. 2A and 2B illustrate additional aspects according to the present invention.
Figure 2B:
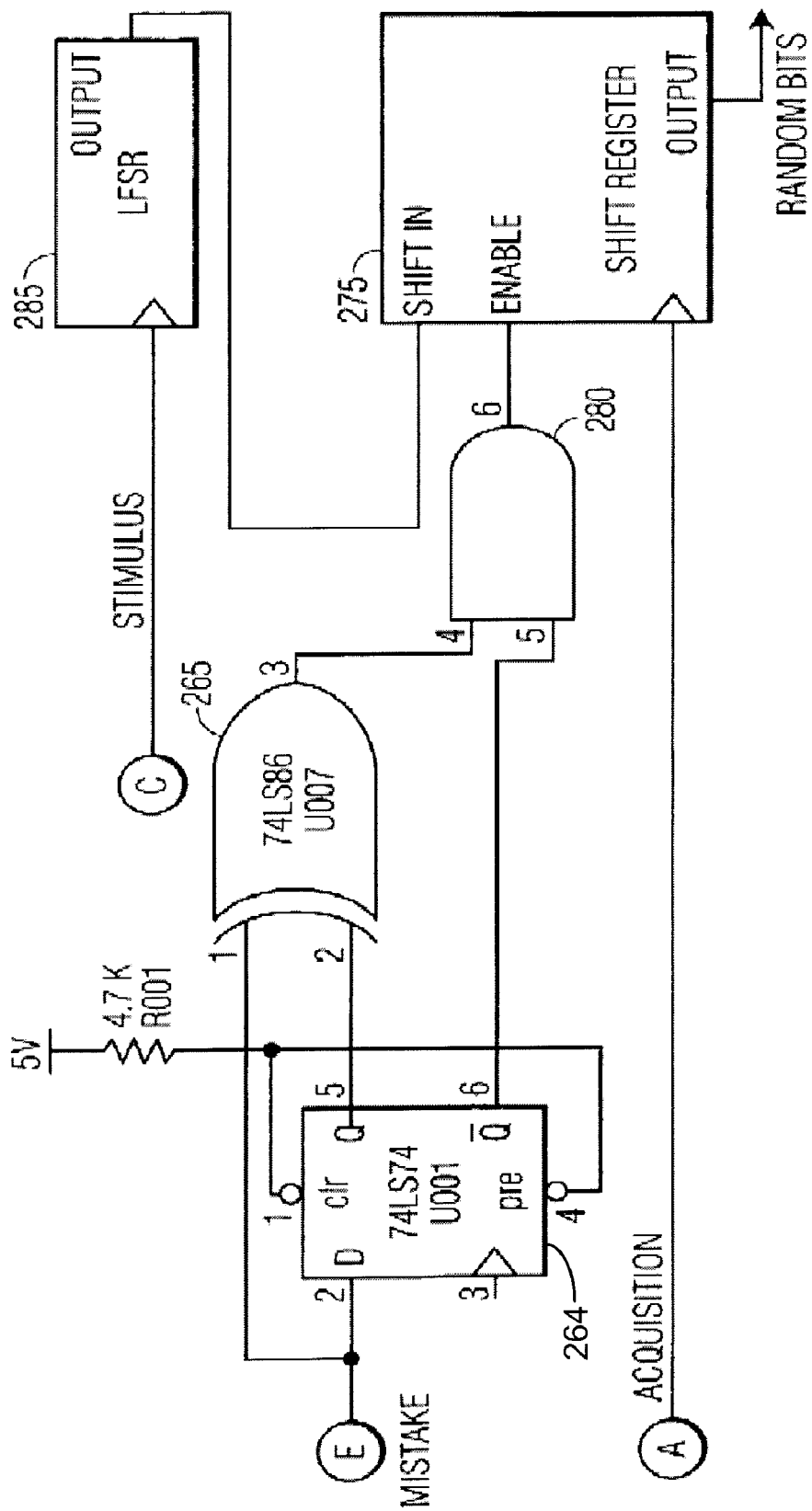

The Q output 9 of flip-flop 205 is provided to pins 1, 5, 9 and 12 of a 74LS00, which is a quad 2 input NAND gate circuit shown in FIG. 2. The outputs of quad gates 210 and 215 are cross connected to their inputs forming a latch, and the same arrangement up is employed for 220, and 225. Again the 74LS00 is shown for illustrative purposes and does not limit the instant invention as equivalent circuitry can be used. The Q output of pin 9 of flip flop 205 is also provided to an input labeled "STIMULUS" which stimulates the latches to a metastable state. The "STIMULUS" signal is used in FIG. 2B to advance LFSR 285.

The output of NAND gate 210 is latch0 and the output of NAND gate 220 is latch1. The latch0 and latch1 outputs, along with the acquisition output are provided to the arrangement of flip-flops shown in FIG. 2A. It is expected that the outputs latch0 and latch1 will have metastable voltage levels which are neither a logical "zero" or a logical "one", therefore the circuit in FIG. 2A converts possible metastable signals to known logical "zeros" and "ones" as well as bringing the timing of these metastable values into synchronicity with the acquisition signal. Should the latches come out of their metastable state in a timely fashion the synchronizer circuit in FIG. 2A will capture this random result. The outputs of the parallel chains of flip-flops in FIG. 2A are then XOR'ed and the output of which is labeled "Mistake." The "Mistake" signal represents a disagreement between the latch0 and latch1 signals. Since latch0 and latch1 are a random result based on metastable behavior they will disagree (a "mistake") about half the time under specialized circumstances. However such ideal conditions will in general not be achieved thus creating additional uncertainty about when "Mistakes" will occur.

Figure 3A:
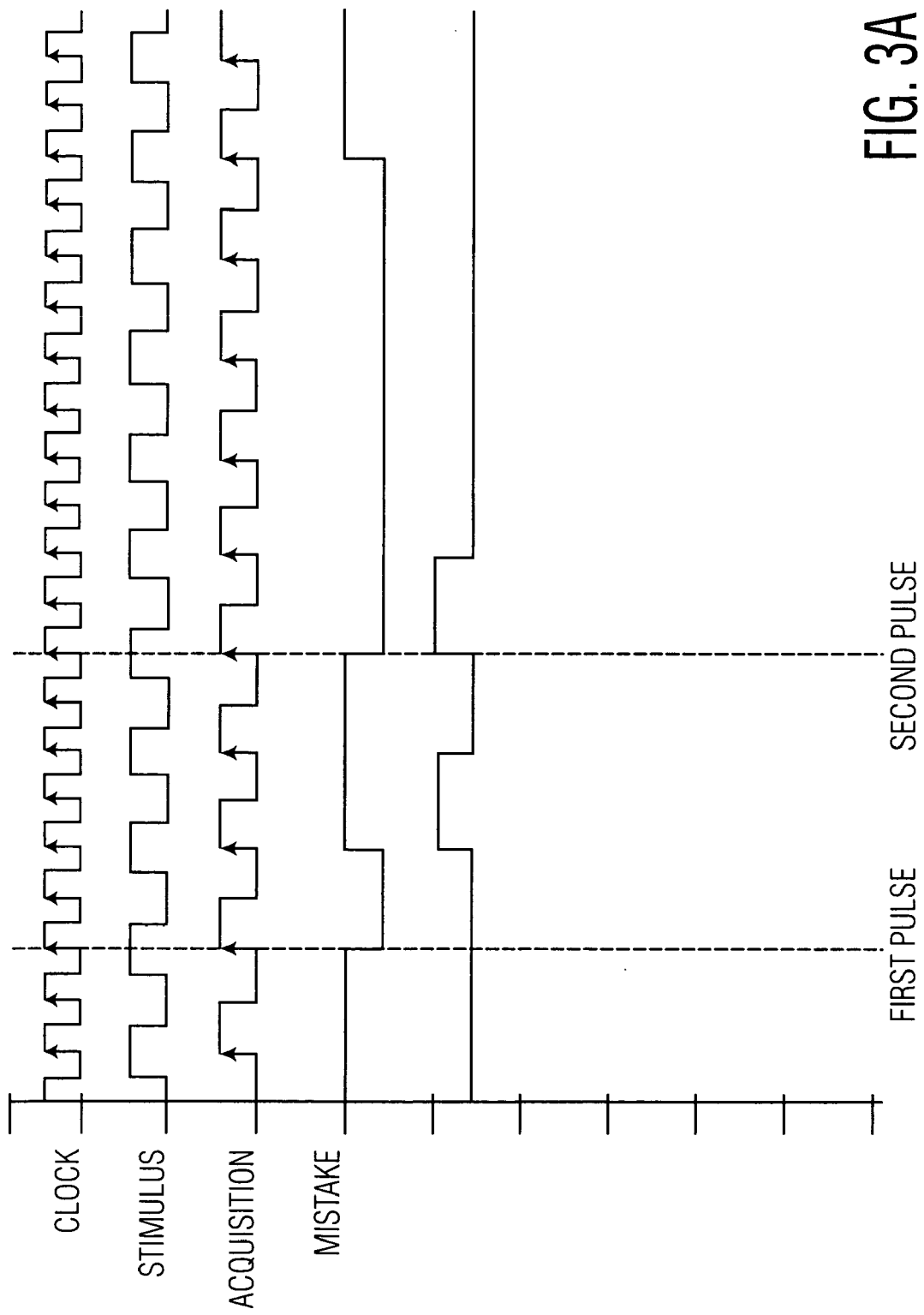
FIGS. 3A and 3B illustrates waveform outputs according to the present invention.
Figure 3B:
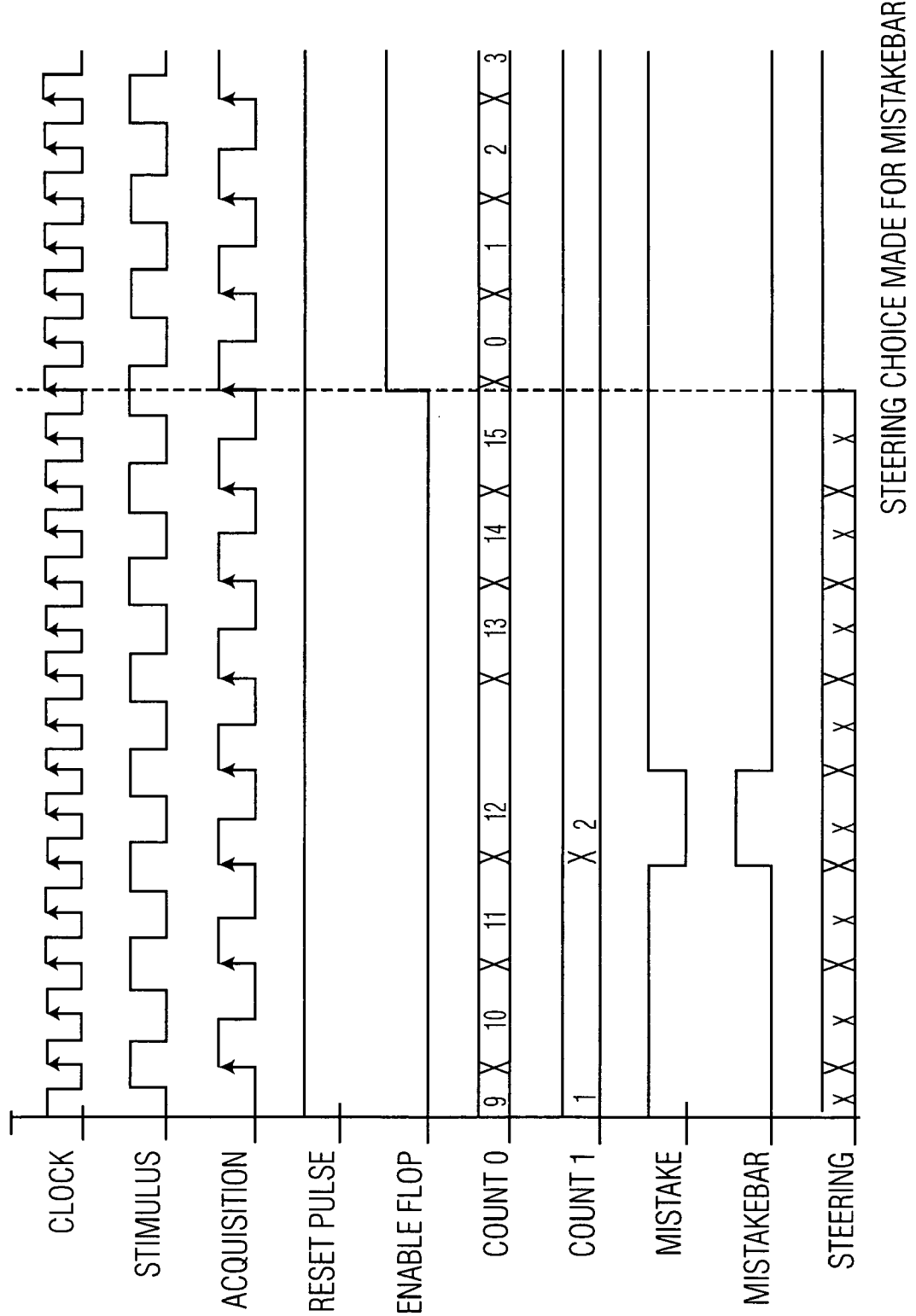

FIG. 2B shows an arrangement using the input mistake, acquisition and stimulus to provide an output from a shift register resulting in random bits shown in the waveforms in FIGS. 3A and 3B.

The XOR gate 265, shown in FIG. 2B compares the mistake signal with a previously stored mistake signal. The stored version of the mistake signal is kept in flip-flop 264. If the stored version of mistake disagrees with the current version a bit is stored in the shift register 275 provided the stored value is a logical zero. The shift register is enabled for shifting via AND gate 280. Again this circuit is a typical one, other arrangements such as allowing a new bit to be acquired when the stored mistake signal is a logical one, or acquiring a bit whenever a stored mistake is different from the current mistake signal are also possible.

The mistake signal apparatus is only used to define the appropriate time to acquire the random bit. The source of the random bit is a Linear Feedback Shift Register (LFSR) 285, preferably of a length of at least 64 bits using a dense polynomial as is known in the art. Such an LFSR produces a statistically even (nearly the same number of zeros as ones on average) predictable stream of bits. In order to ensure unpredictability the stimulus signal clocks the LFSR each time it rises from a low to a high signal. Thus the changes in the stimulus signal, which are regular, advance the LFSR each acquisition cycle. But the mistake apparatus decides when to acquire a bit. Since the acquisition of bits from the LFSR cannot be predicted the stream is random. An LFSR of 64 bits or more will produce a stream of bits that are nearly balanced (good enough for all practical purposes). Since the source of the bits is evenly the balanced the acquired bits are also evenly balanced. Thus, the shift register produces a stream of unpredictable, but statistically even (the same number of zeroes and ones on average) stream of bits. The system can be visualized best by seeing the LFSR producing a pseudo-random stream of bits that have nearly the same number of zeroes as ones. The rest of circuit randomly "picks" bits from this pseudo-random stream producing an unpredictable random stream of bits.

It is understood by persons of ordinary skill in the art that the examples illustrated and described have been provided for purposes of illustration, and not for limitation of the claimed invention to those illustrations. A person of ordinary skill in the art understand that various equivalent circuitry could be provided that does not depart from the spirit of the invention and the scope of the appended claims. For example, it is not necessary to use flip-flops for certain features, and different types of flips-flops other than those shown in described are satisfactory. Also, the LFSR is just one way to obtain a random bit by the invention, and other types of pseudo-random devices can be employed.

What is claimed is:

1. A random number generator comprising:
   a plurality of cross-connected latches providing at least two latch outputs;
   first XOR logic that receives input signals derived from the at least two latch outputs, wherein said first XOR logic generates a current value of a mistake signal "E" when the input signals do not match; and
   second XOR logic to compare the current value of the mistake signal with a previously stored value of the mistake signal to determine whether to obtain a random bit from a pseudo random stream of bits.

2. The random number generator according to claim 1, further comprising:
   an XOR network comprising a plurality of strings of cascaded flip-flops, wherein an output of each of the plurality of strings is connected to the first XOR logic, and wherein each respective latch output of the at least two latch outputs is connected to an input of a respective string of the plurality of cascaded flip-flops.

3. The random number generator according to claim 2, wherein the plurality of strings of cascaded flip-flops comprise D flip-flops.

4. The random number generator according to claim 2, further comprising a flip-flop arrangement driven by third XOR logic to provide an acquisition signal "A" that is input to the XOR network as a clock input to the strings of cascaded flip-flops.

5. The random generator according to claim 1, further comprising a flip-flop to store a logical value of said previously stored value of the mistake signal.

6. The random generator according to claim 5, further comprising a shift register to store a bit if the previously stored value of the mistake signal disagrees with the current value of the mistake signal.

7. The random number generator according to claim 6, wherein the bit is stored in the shift register when the previously stored value of the mistake signal is a logical zero.

8. The random number generator according to claim 6, further comprising an AND gate to enable the shift register for shifting, wherein said AND gate comprises a first input from said second XOR logic and a second input from said flip-flop.

9. The random number generator according to claim 6, further comprising a Linear Feedback Shift Register (LFSR) to generate the pseudo-random steam of bits.

10. The random number generator according to claim 9, wherein the LFSR has at least 64 bits.

11. The random generator according to claim 1, further comprising a shift register to store a bit if the previously stored value of the mistake signal disagrees with the current value of the mistake signal.

12. The random number generator according to claim 1, further comprising a Linear Feedback Shift Register (LFSR) to generate the pseudo-random stream of bits.

13. The random number generator according to claim 12, wherein the LFSR has at least 64 bits.

14. A method of random number generation comprising:
   generating at least two latch outputs from a plurality of cross-connected latches;
   receiving input signals derived from the at least two latch outputs as an input to first XOR logic;
   generating a current value of a mistake signal "E" when the input signals do not match; and
   comparing the current value of the mistake signal with a previously stored value of the mistake signal at second XOR logic to determine whether to obtain a random bit from a pseudo random stream of bits.

15. The method according to claim 14, further comprising obtaining the random bit from the pseudo-random stream of bits.

16. The method according to claim 14, further comprising:
providing an XOR network comprising a plurality of strings of cascaded flip-flops, wherein an output of each of the plurality of strings is connected to the first XOR logic, and wherein each respective latch output of the at least two latch outputs is connected to an input of a respective string of the plurality of cascaded flip-flops.

17. The method according to claim 16, wherein the plurality of strings of cascaded flip-flops comprise D flip-flops.

18. The method to claim 16, further comprising:
providing an acquisition signal "A" from a flip-flop arrangement driven by third XOR logic; and
inputting the acquisition signal "A" to the XOR network as a clock input to the strings of cascaded flip-flops.

19. The method according to claim 14, further comprising storing a logical value of said previously stored value of the mistakes signal in a flip-flop.

20. The method according to claim 19, further comprising storing a bit in a shift register the previously stored value of the mistakes signal disagrees with the current value of the mistakes signal "E."

21. The method according to claim 20, further comprising storing the bit in the shift register only when the previously stored value of the mistake signal is a logical zero.

22. The method according to claim 20, further comprising enabling the shift register for shifting via an AND gate, wherein said AND gate receives a first input from said second XOR logic and a second input from said flip-flop.

23. The method according to claim 14, further comprising storing a bit in a shift register if the previously stored value of the mistakes signal disagrees with the current value of the mistakes signal "E."

* * * * *